United States Patent [19]

Martinez, Jr.

[11] Patent Number: 4,642,603
[45] Date of Patent: Feb. 10, 1987

[54] BRAKE ROD EXTENSION INDICATOR

[75] Inventor: Antonio Martinez, Jr., El Monte, Calif.

[73] Assignee: Atel Corporation, South El Monte, Calif.

[21] Appl. No.: 630,313

[22] Filed: Jul. 11, 1984

Related U.S. Application Data

[63] Continuation-in-part of Ser. No. 549,982, Nov. 8, 1983, abandoned.

[51] Int. Cl.⁴ .............................................. B60Q 1/00
[52] U.S. Cl. ................................. 340/52 B; 188/1.11; 340/52 A
[58] Field of Search ........................... 340/52 A, 52 B; 188/1.11; 116/208; 200/61.4, 61.44, 81 B

[56] References Cited

U.S. PATENT DOCUMENTS

| | | | |
|---|---|---|---|
| 2,914,630 | 11/1959 | Ralston | 188/1.11 X |
| 3,093,716 | 6/1963 | Horowitz | 200/83 N |
| 3,298,466 | 1/1967 | Ayers, Jr. et al. | 188/1.11 |
| 3,683,137 | 8/1972 | Stiltner | 200/83 B |

FOREIGN PATENT DOCUMENTS 1512003  4/1975  United Kingdom ............... 188/1.11

Primary Examiner—James L. Rowland
Assistant Examiner—Jeffery A. Hofsass
Attorney, Agent, or Firm—Donald D. Mon

[57] ABSTRACT

A brake rod extension indicator in which sensor means is incorporated into the brake actuator to indicate when the brake rod overextends. This can give warning of the need for brake adjustment, need for replacement of linings, or of failure of parts in the brake system.

6 Claims, 8 Drawing Figures

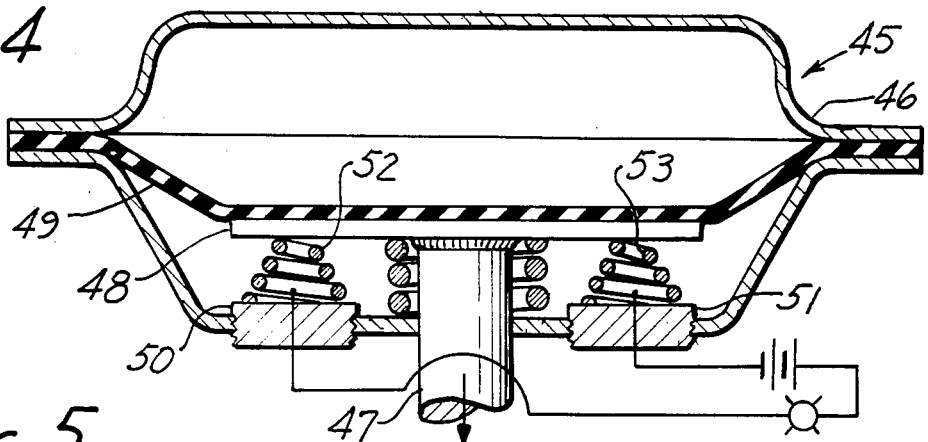
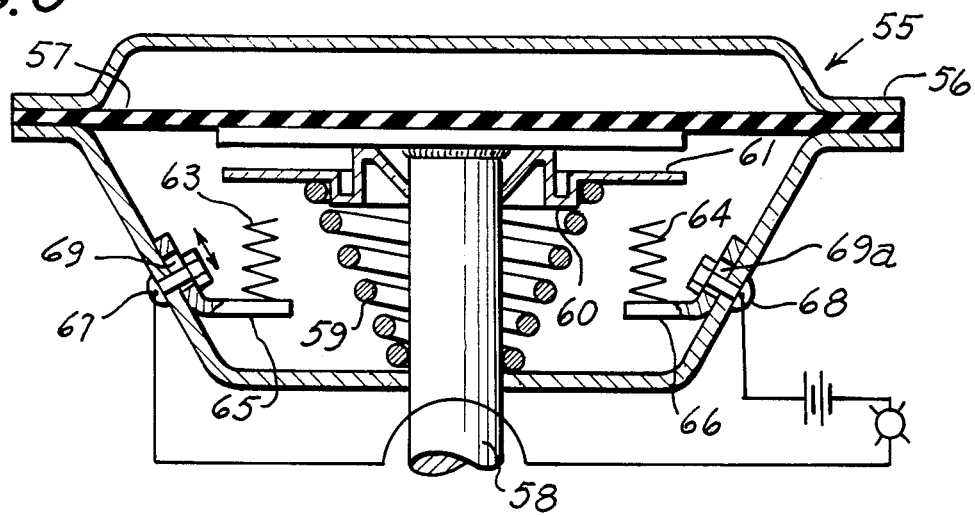
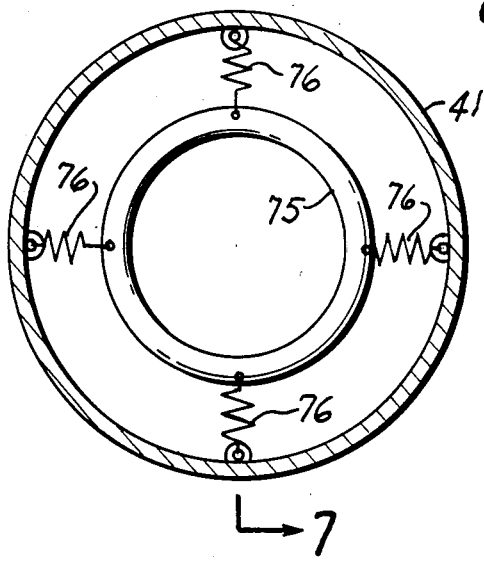
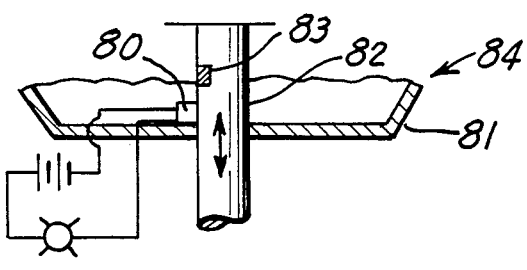

BRAKE ROD EXTENSION INDICATOR

CROSS-REFERENCE TO COPENDING APPLICATION

This is a continuation-in-part of applicant's presently copending U.S. patent application, Ser. No. 549,982, now abandoned, filed Nov. 8, 1983, entitled "Brake Rod Extension Indicator".

FIELD OF THE INVENTION

This invention relates to an indicator for monitoring the travel of a brake push rod.

BACKGROUND OF THE INVENTION

Especially in larger brake installations, such as for trucks, overtravel of a brake rod is indicative of a number of potential problems. Although the actual amount of allowable brake rod travel varies from model to model, generally no more than about 2 inches of travel will be tolerated anywhere, because then there is trouble in the brake system. Overtravel most frequently reflects a need for adjustment of the brakes, and detection of the need for such an adjustment is a principal objective of this invention.

Monitoring the brake rod travel also monitors the operation of important brake components while the vehicle is in motion. For example, slack adjusters, both manual and automatic, can lose teeth and permit overtravel of the rod. Clevis pins can be lost, cams can be broken, drums can become cracked or bell-shaped, brake linings can become detached, and brake shoe rollers and pins can be lost. All of these can result in overtravel of the brake rod. With the use of this invention, such overtravel is detected and reported even while traveling, and the vehicle can be stopped before an accident occurs.

Thus it is an object of this invention to provide a monitor which is responsive to brake problems, and which gives warning whenever brake rod overtravel occurs.

BRIEF DESCRIPTION OF THE INVENTION

A brake rod extension indicator according to this invention includes a brake rod actuator which has a housing defining a cavity with a diaphragm dividing the cavity into a first chamber and a second chamber. One of these chambers is adapted to receive air at a differential pressure relative to the atmosphere to move the diaphragm in a direction to actuate the brakes. The brake rod is connected to the diaphragm so as to be moved by the diaphragm in order to operate the brakes.

An electrical contact is insulatingly supported in the housing in one of the chambers in the path of the diaphragm's movement when the brake rod is moved to apply the brakes. An electrically conductive member is carried by the diaphragm to make an electrical connection with the contact when the brake rod has arrived at a pre-determined position. The contact is adapted for connection with circuitry which indicates arrival at this predetermined position. The contact is constructed so as not to create a rigid barrier to movement of the diaphragm within the anticipated normal and abnormal range of diaphragm and rod movement, in order that the abnormal movement of the diaphragm will not damage the device.

According to a preferred but optional feature of the invention, a pair of said contacts is provided, and the conductive member interconnects the two contacts when the predetermined position has been reached.

According to yet another preferred but optional feature of the invention, the indicator means includes circuitry having either aural or optical signal means to indicate overtravel of the brake rod.

According to still another preferred but optional feature of the invention, the contact or contacts is itself supported by resilient means so as to be deflectable by the diaphragm.

According to yet another optional feature of the invention, instead of providing apparatus to make a conductive contact, position sensors can be placed on the rod and on the housing, to provide a signal when a pre-determined extension has occurred.

The above and other features of this invention will be fully understood from the following detailed description and the accompanying drawings, in which:

BRIEF DESCRIPTION OF THE DRAWINGS

FIG. 4 is an axial cross-section of a device similar to FIG. 1, and illustrating a preferred feature of the invention;

FIG. 5 is an axial cross-section showing the presently preferred embodiment of the invention;

FIG. 6 is a cross-section taken at line 6—6 in FIG. 7; and

FIG. 7 is a cross-section taken at line 7—7 in FIG. 6.

FIG. 8 is a schematic view of another embodiment of the invention.

DETAILED DESCRIPTION OF THE INVENTION

Figure 1:
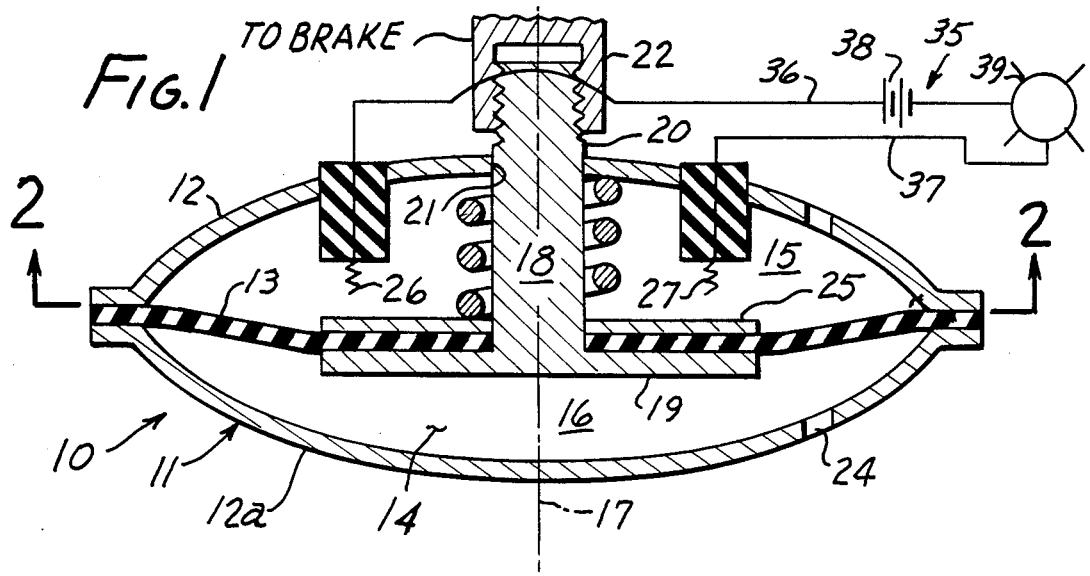
FIG. 1 is an axial cross-section of the presently preferred embodiment of the invention taken at line 1—1 in FIG. 2.
Figure 2:
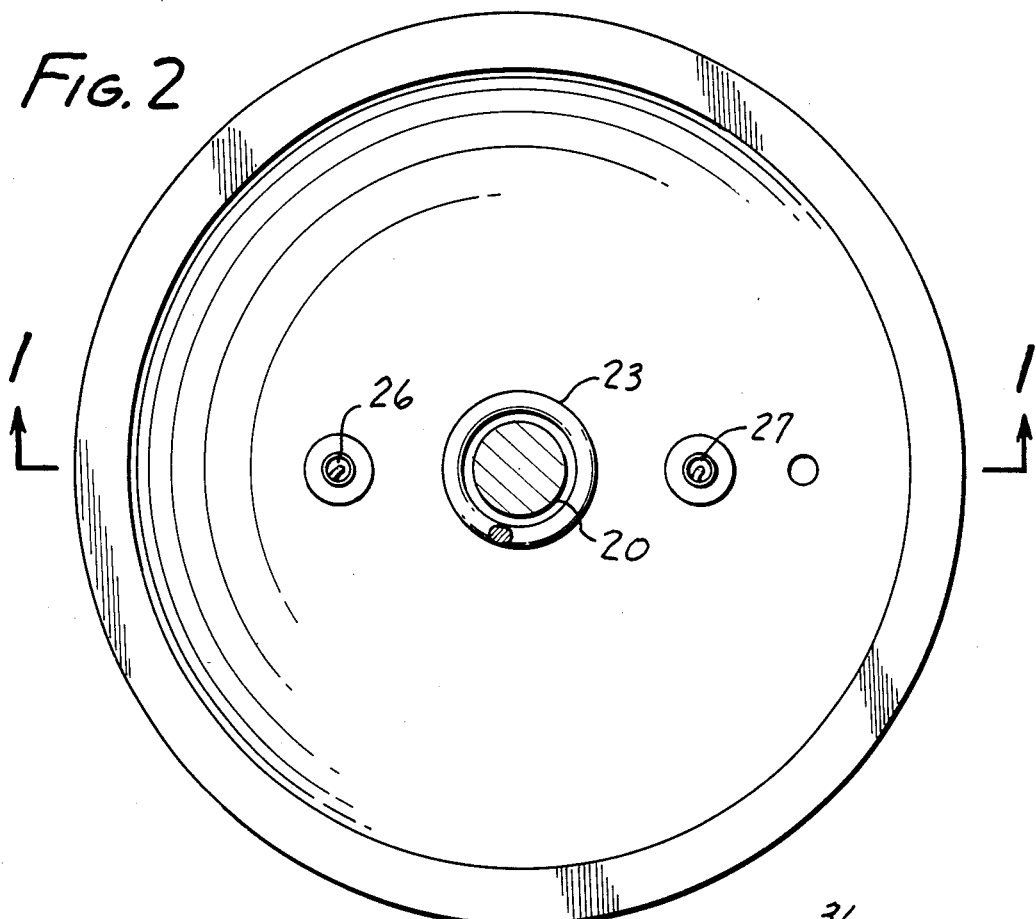
FIG. 2 is a cross-section taken at line 2—2 in FIG. 1.

A brake rod actuator 10 according to the invention is shown in FIG. 1. It includes a housing 11 having a pair of mating shells, 12, 12a, which clamp against the edge of a flexible diaphragm 13. The diaphragm divides a cavity 14 inside the housing into a first chamber 15 and a second chamber 16. The diaphragm is moveable in a direction along an axis 17 of actuation. A plunger 18 has a head 19 abutting against the diaphragm for support purposes, and a shaft 20 which passes through an aperture in the wall of the first chamber. A brake rod 22 is attached to the shaft 20. A return spring is interposed between the housing and the diaphragm so as to bias the diaphragm toward its unactuated position. A pressure port 24 is provided to permit entry of air under pressure into the second chamber for actuation purposes. The first chamber is suitably ported to atmosphere. The reverse arrangement would be made for vacuum actuated brakes.

Figure 3:
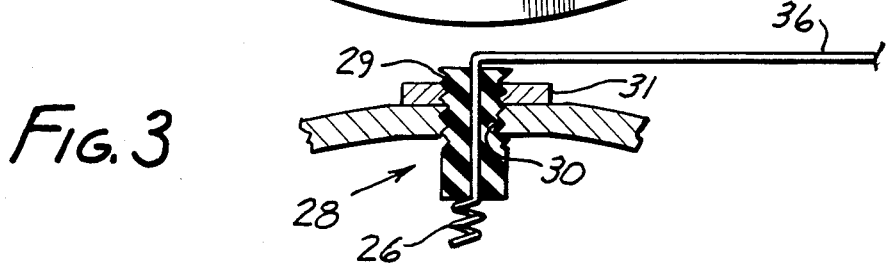
FIG. 3 is a fragmentary showing of contact means according to the invention.

An electrically conductive contactor 25 is mounted flush against the diaphragm and is carried by the diaphragm. It can be a plate made of conductive metal. Two electrical contacts 26, 27 are insulatingly supported in the first chamber. The preferred means mounting these is shown in FIG. 3, where only mount 28 is shown. A similar mount will be provided for electrical contact 27. The mount has an external thread 29 which is threaded into aperture 30 through the housing so it can be turned to adjust its position. A lock nut 31 is threaded onto the thread so as to hold the mount in adjusted position. Contact 26 is similarly mounted to the mount so that its axial position relative to the diaphragm, and thereby to the brake rod is adjustable. The contacts are preferably electrically conductive coil springs.

Circuitry 35 comprises lead 36, 37, extending to contacts 26, 27. As customary, there will be a battery 38, perhaps the vehicles battery or buss bar to provide energy for the actuation of the indicator means. Indicator means 39, which may be a light or an aural signal means or both, is provided.

A potential problem with the device of FIG. 1 is that in the event of excessive overtravel of the diaphragm, contact may be made with the insulating mount 28, and the mount might be punched out of the case. If the compressed length of the return spring is insufficient to protect the mount, as might be the case when a tapered spring rather than a straight coiled spring is used, this risk can exist. For this reason, an actuator 45 shown in FIG. 4 which has a construction similar to that in FIG. 1 including a housing 46, brake rod 47, contactor 48, and diaphragm 49, as well as the other elements, has mounts 50, 51 that are so short in elevation they are substantially flush with the wall of the actuator. Contacts 52, 53 extend freely above these mounts, and the overtravel and the dimensions of the device are selected such that any anticipated overtravel of the rod will not result in the contactor's driving the mounts out of the housing.

FIG. 5 shows another embodiment of the invention with several features including a preferred contact mount. In this actuator 55, there is a housing 56 with a diaphragm 57, rod 58, and ports as described for the device of FIG. 1. The return spring 59 is tapered, with its larger end held by a circular shoulder 60 on a spring retainer 61 snugly fitting around the brake rod. The other end bears against the housing. This spring retainer is made of conductive metal. Its tapered inner portion clears the weldment which attaches the rod to the contactor.

When the movement of the diaphragm causes axial motion of the rod, the spring retainer moves toward or away from contacts 63, 64 which contacts are preferably coil springs, either straight or tapered. These springs in turn are attached to resilient supports 65, 66 that are attached to the housing. The supports may be made stiffly resilient so as to support the springs for contact with the spring retainer when the rod is in a predetermined position. Overtravel will result merely in the deflection of the resilient supports and will not drive them out of the housing or otherwise damage the installation. They are attached to the wall of the housing by bolts 67, 68. Slots 69, 69a in the supports enable the position of the supports to be adjusted.

FIGS. 6 and 7 show still another embodiment of the invention which is particularly well-suited for use with wedge brakes of the type that are frequently used with the front disc brakes of heavy duty trucks. This actuator 70 has a housing 71, diaphragm 72, rod 73, and contactor 74 as in the other embodiments. The contactor is a conductive metal plate as before. The other contact is a metal ring 75 supported centrally in the housing by a plurality of suitably insulated support springs 76. When the rod moves down and the contactor contacts the metal ring, and then overtravels the support springs merely yield to permit this movement without harm to the device. It will be understood that in this embodiment the circuitry extends from the metal ring and from the rod or contactor.

In all of these embodiments, there is a means for making an electrical contact when the rod has reached a predetermined position. While two contacts are shown in FIGS. 1-5, it is evident from FIGS. 6 and 7 that only a single contact may be utilized by making appropriate modification to the circuitry.

In any event, the contacts should be as such that within the range of expected normal and abnormal travel, the rod or equipment associated with it such as the contactor should not run into a mount or other parts which will tend to be destroyed or driven out of the housing by this overtravel.

FIG. 8 shows a broader concept for sensing overtravel. Instead of a conductive contact, a magnetic pickup 80 is mounted to housing 81 adjacent to a brake rod 82. The brake rod carries a magnetic insert 83 which, when it reaches the pickup, will cause the pickup to assume a condition indicative of overextension of the rod. The actuator 84 includes a diaphragm, pluger head, and chambers as in the other embodiments. FIG. 8 illustrates that conductive contacts, while preferred, are now the only means to detect overextension of the brake rod.

This invention is not to be limited by the embodiments shown in the drawings and described in the description which are given by way of example and not of limitation, but only in accordance with the scope of the appended claims.

I claim:

1. A brake actuator provided with means for sensing brake rod overtravel, said actuator comprising:

a housing defining a cavity, a diaphragm dividing said cavity into a first chamber and a second chamber, said first chamber being adapted to receive air under pressure, and said second chamber being vented to atmosphere and having a rod aperture therethrough, said housing including a peripheral wall bounding said second chamber;

a plunger comprising a rigid plate and a rod joined to said plate, said rod extending along an axis of actuation, said plate having a substantial area in surface-to-surface contact with said diaphragm to support the central portion of the diaphragm and transmit force from said diaphragm developed by differential pressure between the two chambers, said rod passing through said rod aperture, said plate being normal to said rod;

spring bias means biasing said plunger in the direction of said first chamber;

conductive means facing axially into said second chamber, unitarily movable with said plate, and lying within the area defined by said plate;

first contact means disposed in the axial path of said conductive means, comprising a resilient, deflectible spring having a free end adapted to be contacted by said conductive means;

contact mount means mounted to said peripheral wall for axially selectible adjustable positioning thereon, including a free flange projecting laterally away from said peripheral wall, and supporting said first contact means in the path of said conductive means, said free flange being resilient, whereby said first contact means and contact mount means exert only resilient response to contact by said conductive means within the anticipated normal and abnormal range of axial movement of said plunger; and circuitry and circuit connections with said conductive means and contact means to indicate whether they are in contact with one another or not.

2. A brake actuator according to claim 1 in which said conductive means is a rigid conductive structure carried by the plunger.

3. A brake actuator according to claim 1 in which said conductive means is a conductive portion of the plate itself.

4. A brake actuator according to claim 1 in which said contact mount means is a bent plate, the portion of the plate mounted to the peripheral wall being out of the path of the plunger.

5. A brake actuator according to claim 4 in which said plate is slotted to enable the contact mount means to be axially positioned.

6. A brake actuator according to claim 1 in which a second said contact means and contact mount means are mounted to said peripheral wall, contactible by said conductive means for inclusion in said circuitry.

* * * * *